(12) United States Patent
Kobayashi (10) Patent No.: US 6,208,867 B1
(45) Date of Patent: Mar. 27, 2001

(54) PORTABLE TERMINAL SYSTEM, OPTION APPARATUS FOR PORTABLE TERMINAL UNIT, AND METHOD FOR CONNECTING PORTABLE TERMINAL UNIT AND OPTION APPARATUS FOR PORTABLE TERMINAL UNIT

(75) Inventor: Takeshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/062,101

(22) Filed: Apr. 17, 1998

(30) Foreign Application Priority Data

Apr. 25, 1997 (JP) .................................................. 9-109324

(51) Int. Cl.⁷ ..................................................... H04Q 7/20
(52) U.S. Cl. .......................... 455/462; 455/568; 455/575; 455/557; 379/56.3
(58) Field of Search ................................... 455/462, 11.1, 455/31.3, 74.1, 559, 568, 569, 90, 575, 557, 41; 370/277–279, 283; 359/109, 113, 135–7; 379/55.1, 56.1–56.3

(56) References Cited

U.S. PATENT DOCUMENTS

| | | | |
|---|---|---|---|
| 5,446,783 | * 8/1995 | May | 455/557 |
| 5,590,417 | 12/1996 | Rydbeck . | |
| 5,636,264 | * 6/1997 | Sulavuori et al. | 359/113 |
| 5,757,277 | * 5/1998 | Kobayashi | 340/825.22 |
| 5,771,438 | * 6/1998 | Palermo et al. | 455/41 |
| 5,781,321 | * 7/1998 | Kobayashi | 359/143 |
| 5,835,862 | * 11/1998 | Nykanen et al. | 455/559 |
| 5,943,627 | * 8/1999 | Kim et al. | 455/569 |
| 5,982,764 | * 11/1999 | Palermo et al. | 370/345 |

FOREIGN PATENT DOCUMENTS

| | | |
|---|---|---|
| 0585030 | 3/1994 | (EP) . |
| 0772307 | 5/1997 | (EP) . |
| 2304247 | 3/1997 | (GB) . |
| 59-169237 | 9/1984 | (JP) . |
| 3-162021 | 7/1991 | (JP) . |
| 3-162024 | 7/1991 | (JP) . |
| 6-113036 | 4/1994 | (JP) . |
| 6-31241 | 4/1994 | (JP) . |
| 6-291714 | 10/1994 | (JP) . |
| 8-19024 | 1/1996 | (JP) . |
| 8-500476 | 1/1996 | (JP) . |
| 8-293830 | 11/1996 | (JP) . |

OTHER PUBLICATIONS

International Search Report issued in connection with the corresponding PCT application (Aug. 25, 1998).

* cited by examiner

Primary Examiner—Dwayne D. Bost
Assistant Examiner—Charles Craver
(74) Attorney, Agent, or Firm—Ostrolenk, Faber, Gerb & Soffen, LLP (57) ABSTRACT

A portable terminal system is arranged by an option apparatus 1 for a portable terminal unit and a portable terminal unit. The option apparatus 1 for the portable terminal unit communicates with a base station by using electromagnetic waves by a first radio transmitter/receiver circuit 11, and further communicates with the portable terminal unit 2 by using infrared radiation by a first infrared type connection apparatus 16. On the other hand, the portable terminal unit 2 communicates with the option apparatus 1 used with the portable terminal unit by using infrared radiation by a second infrared type connection apparatus. Since the option apparatus 1 for the portable terminal unit is connected to the portable terminal 2 by way of the infrared radiation, the connection works can be readily performed, and further various types of portable terminal units can be mutually connected to various sorts of option apparatuses for portable terminal units.

8 Claims, 9 Drawing Sheets

PORTABLE TERMINAL SYSTEM, OPTION APPARATUS FOR PORTABLE TERMINAL UNIT, AND METHOD FOR CONNECTING PORTABLE TERMINAL UNIT AND OPTION APPARATUS FOR PORTABLE TERMINAL UNIT

BACKGROUND OF THE INVENTION

1. Field of the Invention

The present invention generally relates to a portable terminal system, an option apparatus for a portable terminal unit, and a method for connecting the portable terminal unit and the option apparatus for portable terminal unit. More specifically, the present invention is directed to such a technique capable of firmly connecting the portable terminal unit and the option apparatus in a simple manner even when this option apparatus owns a different physical interface from the physical interface of the portable terminal unit.

2. Description of the Related Art

Very recently, portable terminal units such as portable telephones and mobile computers have been developed. Among these portable terminal units, for instance, various adapter apparatuses are optionally connectable with portable telephones in order to newly add functions and/or so as to improve usability. This adapter apparatus will be referred to as an "option apparatus" in this specification. Also, a function realized by connecting such an "option apparatus" to a portable terminal unit will be referred to as an "option function" in this specification. For example, a hands-free adapter and a data adapter are involved in an option apparatus for a portable telephone. Such an "option apparatus" is commercially available as optional equipment for a portable telephone.

Figure 1:
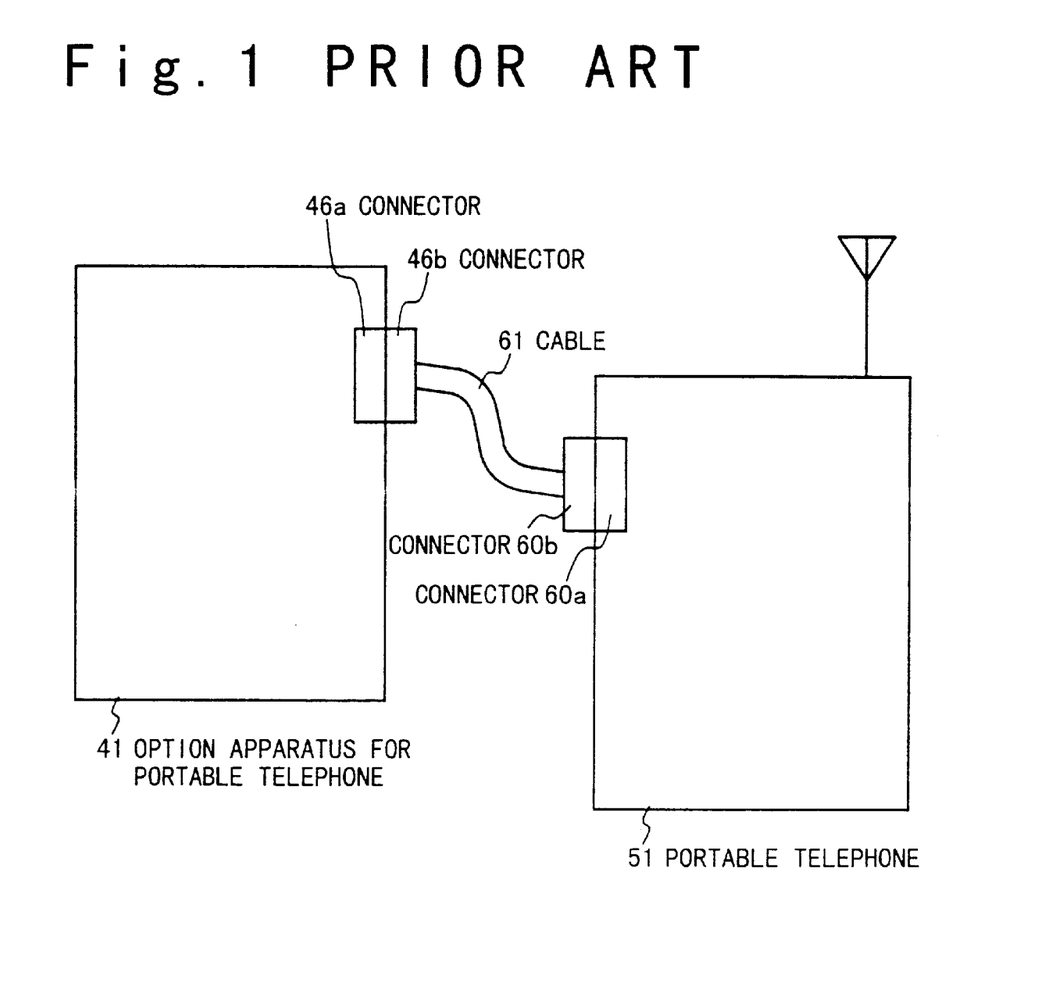
FIG. 1 illustratively shows the conventional connecting method for the portable terminal unit and the option apparatus for the portable terminal unit.

Conventionally, a wire line transfer path is employed so as to connect an option apparatus to a portable terminal unit. For instance, as indicated in FIG. 1, an option apparatus 41 for a portable telephone is connected to a portable telephone 51 by employing a cable 61. In this case, a connector 46b provided at one end of this cable 61 is connected to the connector 46a provided with the option apparatus 41 for the portable telephone, and further another connector 60b provided on the other end of the cable 61 is connected to another connector 60a provided on the portable telephone 51. As a result, the option apparatus 41 for the portable telephone is electrically connected to the portable telephone 51 so as to communicate with each other.

The above-explained conventional method for connecting the portable terminal unit to the option apparatus with employment of such a connector owns the following problem. That is, since the connector must be physically fitted between them under tight condition, the connecting work of the option apparatus cannot be smoothly performed. Also, since this connecting work must be carried out while fixing both the portable telephone and the option apparatus, the difficult connecting work is necessarily required.

Also, the conventional connection methods for connecting the portable terminal units to the option apparatuses are different from each other, depending upon the manufactures of these products. On the other hand, portable terminal units are gradually made compact and are operable under low consumption power in response to market needs. Accordingly, the shapes of these portable terminal units and also the physical interfaces provided between the portable terminal units and the option apparatuses are gradually changed. To the contrary, since compact-requirements and low-operable-consumption-power requirements with respect to the option apparatuses are not so strong, as compared with those for the portable terminal units, the physical interfaces and shapes of these option apparatuses still remain, namely are not changed. As a consequence, there is another problem that when one portable terminal is replaced by a new one, the originally used option apparatus can be no longer used with, of course, a newly purchased portable terminal unit marketed by a different manufacturer, but also even a newly purchased portable terminal unit marketed by the same manufacturer.

Under such a circumstance, another technique capable of connecting a portable terminal unit to an option apparatus by employing other means than the cable would be expected. As one typical connecting technique, for example, Japanese Laid-open Patent Disclosure JP-A-Heisei 3-162021 opened in 1991 discloses such a portable telephone arranged by a main body unit and a telephone receiver unit detachably connected with this main body unit. In this conventional portable telephone, the speech signal received by the main body unit is converted into the infrared signal, and the telephone receiver unit demodulates the received infrared signal to thereby produce the speech signal. Then, the speaker produces speech, or voice in response to this demodulated speech signal. As a result, the telephone conversation can be made in the case that the main body unit is coupled to the telephone receiver unit, and further even when the main body unit is separated from the telephone receiver unit. Also, Japanese Laid-open Patent Disclosure JP-A Heisei 3-162024 discloses another portable telephone improved from the above-explained portable telephone opened in Japanese Laid-open Patent Disclosure JP-A-Heisei 3-162021. This improved portable telephone is arranged in such a manner that the infrared LED is provided on the surface of the main body unit, which is coupled to the telephone receiver unit, and the infrared LED is provided on another surface thereof located opposite to the first-mentioned surface. As a result, even when the main body unit is positioned in the reverse direction, the telephone conversation can be established between the main body unit and the telephone receiver unit.

However, in these conventional portable telephones described in Japanese Laid-open Patent Disclosure JP-A-Heisei 3-162021 and JP-A-Heisei 3-162024, the telephone communications are established between the main body units and the telephone receiver units, which constitute an portion of the respective portable telephones, but no telephone communications are carried out between the portable telephone and the option apparatus. Moreover, these conventional portable telephones introduce such a unidirectional communication technique that the speech signal received by the main body unit is transmitted to the telephone receiver unit. As a consequence, this unidirectional communication technique is not suitably applied to such a connection technique for electrically connecting the portable terminal unit to the option apparatus.

On the other hand, Japanese Laid-open Patent Disclosure JP-A-Heisei 6-291714 opened in 1994 describes the radio selective paging receiver. In this conventional radio selective paging receiver, when a telephone call is made, both the signal used to initiate the mobile telephone and the signal used to issue the dialing call by employing the telephone number are transmitted to the mobile telephone by using the infrared radiation. However, the counter appliance to which this conventional radio selective paging receiver transmits the infrared signals is not an option apparatus of this paging receiver, but is another mobile telephone, for instance, the portable telephone, the automobile telephone, and the cordless telephone. Moreover, this conventional radio selective paging receiver can employ only the unidirectional communication system similar to the aforementioned conventional portable telephones described in Japanese Laid-open Patent Disclosure JP-A-Heisei 3-162021 and JP-A-Heisei 3-162024.

On the other hand, Japanese Laid-open Utility Model Disclosure JU-A-Heisei 6-31241 opened in 1994 discloses the hands-free type automobile portable telephone. This automobile portable telephone is connected to the external speaker by employing the infrared communication means. However, this conventional automobile portable telephone merely introduces the unidirectional communication technique.

Moreover, Japanese Laid-open Patent Disclosure JP-A-Heisei 8-293830 opened in 1996 discloses such a portable telephone for transmitting/receiving the data between this portable telephone and the display adapter employing the infrared emitting element and the infrared receiving element. This data is also transmitted/received between the public network and this portable telephone. However, the display adapter does not own the radio transmitting/receiving function capable of directly communicating with the public network. As a consequence, in the case that the data is transmitted/received via the public network between this portable telephone and other apparatus, another portable telephone having the radio transmitting/receiving function is necessarily required. Therefore, the utilization of this conventional display adapter is limited to a specific field.

SUMMARY OF THE INVENTION

The present invention has been made to solve the above-described various problems, and therefore, has an object to provide an option apparatus for a portable terminal unit, capable of simply and firmly connecting this option apparatus to the portable terminal unit. Another object of the present invention is to provide a method for connecting a portable terminal unit to an option apparatus used with this portable terminal unit, capable of mutually connecting these portable terminal unit and option apparatus even when a physical interface owned by this option apparatus is different from a physical interface owned by the portable terminal unit.

To achieve the above-explained objects, an option apparatus used with a portable terminal unit, according to an aspect of the present invention, includes:

an infrared receiving unit for receiving infrared radiation sent from the portable terminal unit to convert the received infrared radiation into a first electric signal;

an infrared emitting unit for converting a second electric signal into infrared radiation to transmit the converted infrared radiation to the portable terminal unit;

a radio transmitter/receiver unit for receiving electromagnetic waves transmitted from a base station to derive second information from the received electromagnetic waves and for converting first information supplied from the control unit into electromagnetic waves to transmit the converted electromagnetic waves to the base station; and a control unit for producing the second electric signal based on the second information derived from the radio transmitter/receiver unit to supply the produced second electric signal to the infrared emitting unit, and for producing the first information based on the first electric signal acquired from the infrared receiving unit to supply the produced first information to the radio transmitter/receiver unit.

Also, a portable terminal system, according to another aspect of the present invention, includes:

a portable terminal unit; and an option apparatus used with the portable terminal unit, wherein the option apparatus used with the portable terminal unit is constructed of:

a first infrared receiving unit for receiving infrared radiation sent from the portable terminal unit to convert the received infrared radiation into a first electric signal;

a first infrared emitting unit for converting a second electric signal into infrared radiation to transmit the converted infrared radiation to the portable terminal unit;

a first radio transmitter/receiver unit for receiving electromagnetic waves transmitted from a base station to derive second information from the received electromagnetic waves and for converting first information supplied from the first control unit into electromagnetic waves to transmit the converted electromagnetic waves to the base station; and a first control unit for producing the second electric signal based on the second information derived from the first radio transmitter/receiver unit to supply the produced second electric signal to the first infrared emitting unit, and for producing the first information based on the first electric signal acquired from the first infrared receiving unit to supply the produced first information to the first radio transmitter/receiver unit; and the portable terminal unit is constructed of:

a second infrared receiving unit for receiving infrared radiation sent from the option apparatus used with the portable terminal unit to convert the received infrared radiation into a third electric signal;

a second infrared emitting unit for converting a fourth electric signal into infrared radiation to transmit the converted infrared radiation to the option apparatus used with the portable terminal unit; and a second control unit for producing third information based on the third electric signal derived from the second infrared receiving unit, and for producing the fourth electric signal based on fourth information to transmit the produced fourth electric signal to the second infrared emitting unit.

Furthermore, according to another aspect of the present invention, a method for connecting a portable terminal unit to an option apparatus used with the portable terminal unit, is comprised of steps of:

a first step for transmitting information from the option apparatus used with the portable terminal unit to the portable terminal unit; and a second step for transmitting information from the portable terminal unit to the option apparatus used with the portable terminal unit, wherein at the first step, the option apparatus used with the portable terminal unit receives electromagnetic waves transmitted from a base station to derive information from the received electromagnetic waves, and converts the derived information into infrared radiation to transmit the infrared radiation to the portable terminal unit; and the portable terminal unit receives the infrared radiation transmitted from the option apparatus used with the portable terminal unit to derive information from the received infrared radiation; and at the second step, the portable terminal unit converts information into infrared radiation to transmit the converted infrared radiation to the option apparatus used with the portable terminal unit; and the option apparatus used with the portable terminal unit receives the infrared radiation transmitted from the portable terminal unit to derive information from the received infrared radiation, and converts the derived information into electromagnetic waves to transmit the converted electromagnetic waves to the base station.

BRIEF DESCRIPTION OF THE DRAWINGS

The above-described object, other objects, and features of the present invention may be understood by reading a detailed description in conjunction with the accompanying drawings, in which.

DESCRIPTION OF THE PREFERRED EMBODIMENTS

Referring now to drawings, various preferred embodiments of the present invention will be described in detail. It should be understood in the below-mentioned embodiment that a portable telephone is employed as the portable terminal unit whereas an option apparatus for the portable telephone is employed as the option apparatus for the portable terminal unit.

Figure 2A:
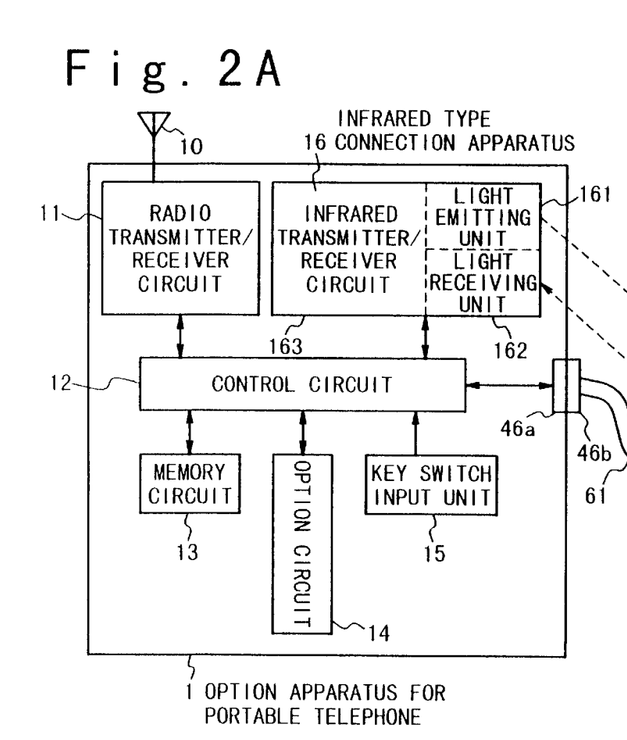
FIG. 2A is a schematic block diagram for representing an arrangement of an option apparatus for a portable telephone according to an embodiment of the present invention.

First, an description will now be made of the option apparatus for the portable telephone. FIG. 2A is a schematic block diagram for indicating an arrangement of an option apparatus 1 for a portable telephone, according to an embodiment of the present invention. This option apparatus 1 for the portable telephone is, for example, a hands-free adapter, and is provided as an option apparatus used for a portable telephone 2.

The option apparatus 1 for the portable telephone is arranged by an antenna 10, a radio (wireless) transmitter/receiver circuit 11, a control circuit 12, a memory circuit 13, an option circuit 14, a key switch input unit 15, an infrared type connection apparatus 16, and a connector 46a.

The radio transmitter/receiver circuit 11 owns a function to transmit/receive information in a radio (wireless) communication manner, and therefore, is provided to connect this option apparatus 1 for the portable telephone to a radio communication line. The antenna 10 is employed in this radio transmitter/receiver circuit 11. The radio transmitter/receiver unit 11 converts a radio signal (electromagnetic wave signal) transmitted from a base station (not shown) and received by this antenna 10 into an electric signal, and then supplies this electric signal to the control circuit 12. Also, the radio transmitter/receiver circuit 11 converts an electric signal supplied from the control circuit 12 into a radio signal, and then transmits this radio signal via the antenna 10 to the base station.

The control circuit 12 controls an entire system of this option apparatus 1 for the portable telephone. For instance, the control circuit 12 processes a signal transmitted/received between the radio transmitter/receiver circuit 11 and the infrared type connection apparatus 16, so that the infrared type connection apparatus 16 can be communicated with the portable telephone 2 by utilizing infrared rays. A detailed operation of this control circuit 12 will be described later. The memory circuit 13 stores thereinto various types of data. The control circuit 12 reads out the data stored in this memory circuit 13. Also, various types of data are written into this memory circuit 13 by the control circuit 12.

The option circuit 14 is to realize the "option" function when this option apparatus 1 for the portable telephone is connected to the portable telephone 2. In this embodiment, the option circuit 14 contains a circuit capable of realizing the hands-free function. This option circuit 14 is operated under control of the control circuit 12. The key switch input unit 15 is used to set various operation modes to this option apparatus 1 for the portable telephone. The data entered from this key switch input unit 15 is supplied to the control circuit 12.

The infrared type connection apparatus 16 is arranged by a light emitting unit 161, a light receiving unit 162, and an infrared transmitter/receiver circuit 163. The (infrared) light emitting unit 161 sends infrared radiation to the portable telephone 2. The (infrared) light receiving unit 162 receives infrared radiation sent from the portable telephone 2. The infrared transmitter/receiver circuit 163 supplies data sent as an electric signal from the control circuit 12 to the light emitting unit 161. As a result, the light emitting unit 161 converts this electric signal into infrared radiation and then transmits this infrared radiation to the portable telephone 2. Also, the infrared transmitter/receiver circuit 163 detects data from the infrared radiation received by the light receiving unit 162 to produce an electric signal which will then be sent to the control circuit 12.

Also, a connector 46a is connected to this control circuit 12. Another connector 46b is inserted into this connector 46a, and the connector 46b is provided on one end side of a cable 61 which is used to be connected to the portable telephone 2. According to a communication mode set from the key switch input unit 15, the control circuit 12 is electrically connected to any one of the infrared type connection apparatus 16 and the connector 46a.

Figure 3:
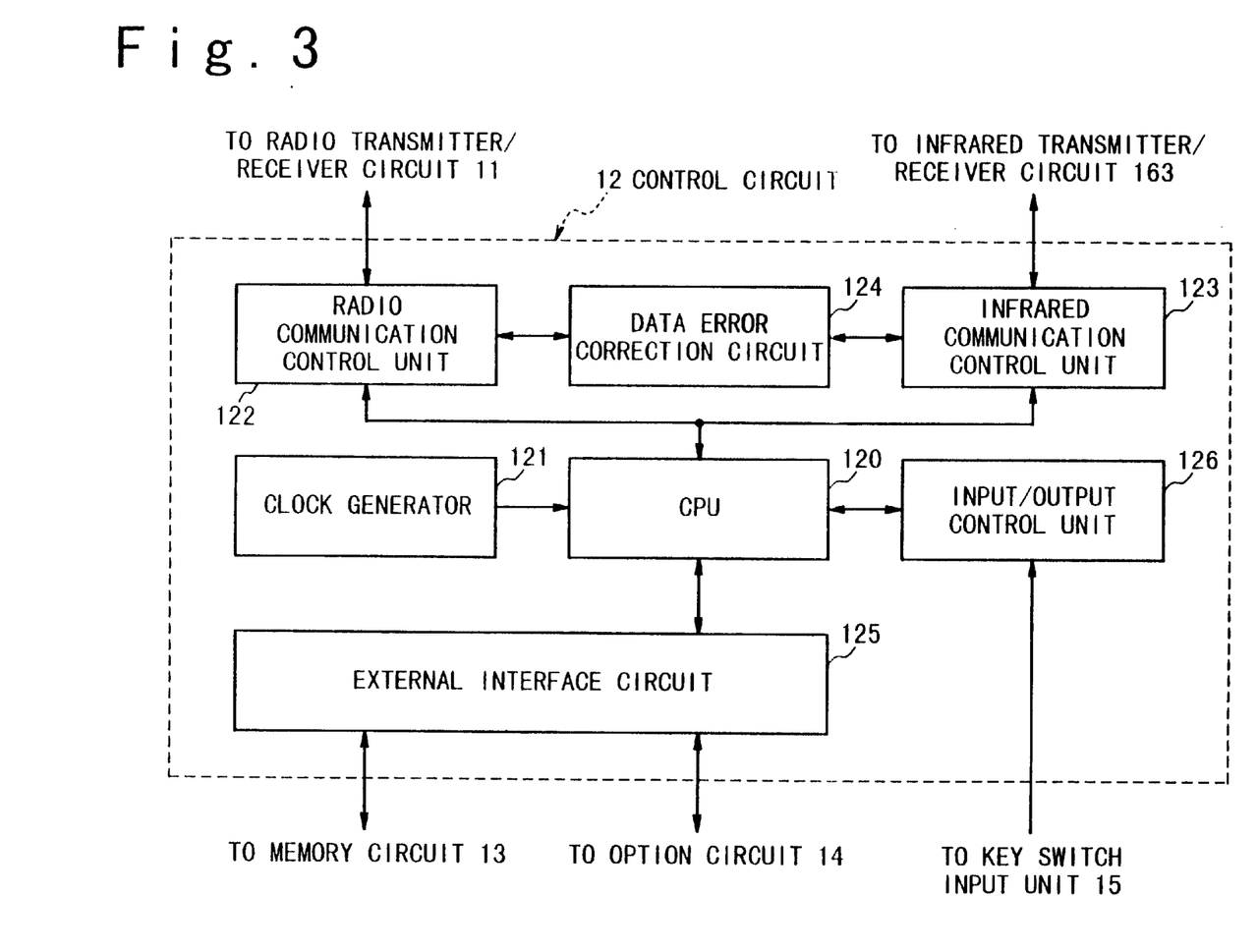
FIG. 3 is a schematic block diagram for indicating a circuit arrangement of a control circuit employed in the option apparatus for the portable telephone shown in FIG. 2A.

Referring now to FIG. 3, the operations and arrangement of the control circuit 12 will be explained in detail. This control circuit 12 is constituted by a CPU (central processing unit) 120, a clock generator 121, a radio communication control unit 122, an infrared communication control unit 123, a data error correction circuit 124, an external interface circuit 125, and an input/output control unit 126.

The CPU 120 controls the overall circuit of this control circuit 12. This CPU 120 is operated in response to a clock signal supplied from the clock generator 121. The radio communication control unit 122 controls signal transmission/reception executed between this CPU 120 and the radio transmitter/receiver circuit 11. The infrared communication control unit 120 controls signal transmission/reception executed between this CPU 120 and the infrared transmission/reception unit 163.

The data error correction circuit 124 is connected to both the radio communication control unit 122 and the infrared communication control unit 123. This data error correction circuit 124 checks as to whether or not data sent from the radio transmitter/receiver circuit 11 via the radio communication control unit 122 contains an error. If this data contains the error, then the data error correction circuit 124 corrects this error to thereby return the error-corrected data to the radio communication control unit 122. As a consequence, the radio communication control unit 122 can continuously send the correct data to the CPU 120.

Similarly, this data error correction circuit 124 checks as to whether or not data send from the infrared transmitter/receiver circuit 163 via the infrared communication control unit 123 contains an error. If this data contains the error, then the data error correction circuit 124 corrects this error to thereby return the error-corrected data to the infrared communication control unit 123. As a consequence, the infrared communication control unit 123 can continuously send the correct data to the CPU 120.

The memory circuit 13 and the option circuit 14 are connected to the external interface circuit 125. This external interface circuit 125 controls signal transmission/reception executed between these circuits and the CPU 120. The key switch input unit 15 is connected to the input/output control unit 126. This input/output control unit 126 controls signal transmission/reception executed between the key switch input unit 15 and the CPU 120.

Figure 2B:
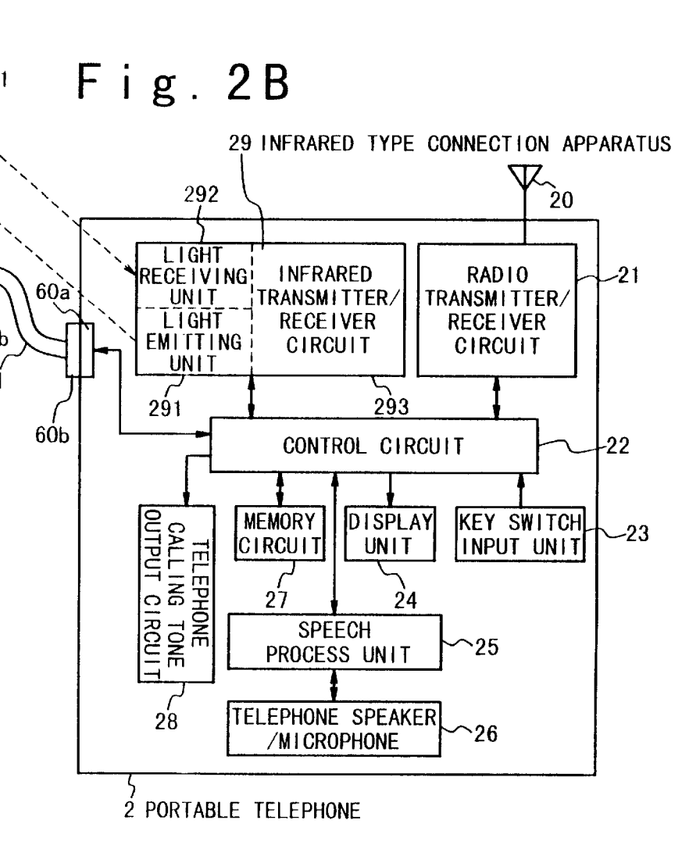
FIG. 2B is a schematic block diagram for representing an arrangement of a portable telephone according to an embodiment of the present invention.

Next, a description will now be made of the portable telephone 2. FIG. 2B is a schematic block diagram for representing an arrangement of the portable telephone 2. The portable telephone 2 is arranged by an antenna 20, a radio transmitter/receiver circuit 21, a control circuit 22, a key switch input unit 23, a display unit 24, a speech process circuit 25, a telephone speaker/microphone 26, a memory circuit 27, a telephone calling tone output circuit 28, an infrared type connection apparatus 29, and a connector 60a.

The radio transmitter/receiver circuit 21 owns a function to transmit/receive information in a radio (wireless) communication manner, and therefore, is provided to connect this portable telephone 2 to a radio communication line. An antenna 20 is employed in this radio transmitter/receiver circuit 21. The radio transmitter/receiver circuit 21 converts a radio signal (electromagnetic wave signal) transmitted from a base station (not shown) and received by this antenna 20 into an electric signal, and then supplies this electric signal to the control circuit 22. Also, the radio transmitter/receiver circuit 21 converts an electric signal supplied from the control circuit 22 into a radio signal, and then transmits this radio signal via the antenna 20 to the base station.

The control circuit 22 controls an entire system of this portable telephone 2. For instance, the control circuit 22 processes a signal transmitted/received between the radio transmitter/receiver circuit 21 and the infrared type connection apparatus 29, so that the infrared type connection apparatus 29 can be communicated with the option apparatus 1 for the portable telephone by utilizing infrared rays. A detailed operation of this control circuit 22 will be described later.

The key switch input unit 23 is used to set various operation modes to this portable telephone. For example, data capable of effectively operating the option apparatus 1 for the portable telephone, and a telephone number are entered from this key switch input unit 23. The data entered from this key switch input unit 15 is supplied to the control circuit 12. The display unit 24 displays present operation conditions of the portable telephone, and also operation results thereof. The data displayed on this display unit 24 is supplied from the control circuit 22.

The speech process unit 25 converts a signal having a predetermined format and supplied from the control circuit 22 into a speech (voice) signal, and then supplies this speech signal to the telephone speaker/microphone 26. Also, this speech process unit 25 converts a speech signal derived from the telephone speaker/microphone 26 into a signal having a predetermined format, and then supplies this signal with the predetermined format to the control circuit 22. The telephone speaker/microphone 26 converts the speech signal supplied from the speech process unit 25 into speech (voice). Also, the telephone speaker/microphone 26 converts speech into a speech signal and then supplies this speech signal to the speech processing unit 25.

The memory circuit 27 stores therein various types of data. The control circuit 22 reads out the data stored in this memory circuit 27. Also, various types of data supplied from the control circuit 22 are written into this memory circuit 27. When a telephone call is made, the telephone calling tone output circuit 28 produces a telephone calling tone capable of indicating a telephone call in response to a signal derived from the control circuit 22. As a consequence, a user can recognize that a telephone call is issued.

The infrared type connection apparatus 29 is arranged by a light emitting unit 291, a light receiving unit 292, and an infrared transmitter/receiver circuit 293. The (infrared) light emitting unit 291 sends infrared radiation to the option apparatus 1 for the portable telephone. The (infrared) light receiving unit 292 receives infrared radiation sent from the option apparatus 1 for the portable telephone. The infrared transmitter/receiver circuit 293 supplies data sent as an electric signal from the control circuit 22 to the light emitting unit 291. As a result, the light emitting unit 291 converts this electric signal into infrared radiation and then transmits this infrared radiation to the option apparatus 1 for the portable telephone. Also, the infrared transmitter/receiver circuit 293 detects data from the infrared radiation received by the light receiving unit 292 to produce an electric signal which will then be sent to the control circuit 22.

Also, a connector 60a is connected to this control circuit 22. Another connector 60b is inserted into this connector 60a, and the connector 60b is provided on the other end side of the cable 61 which is used to be connected to the option apparatus 1 for the portable telephone. According to a communication mode set from the key switch input unit 23, the control circuit 22 is electrically connected to any one of the infrared type connection apparatus 29 and the connector 60a.

Figure 4:
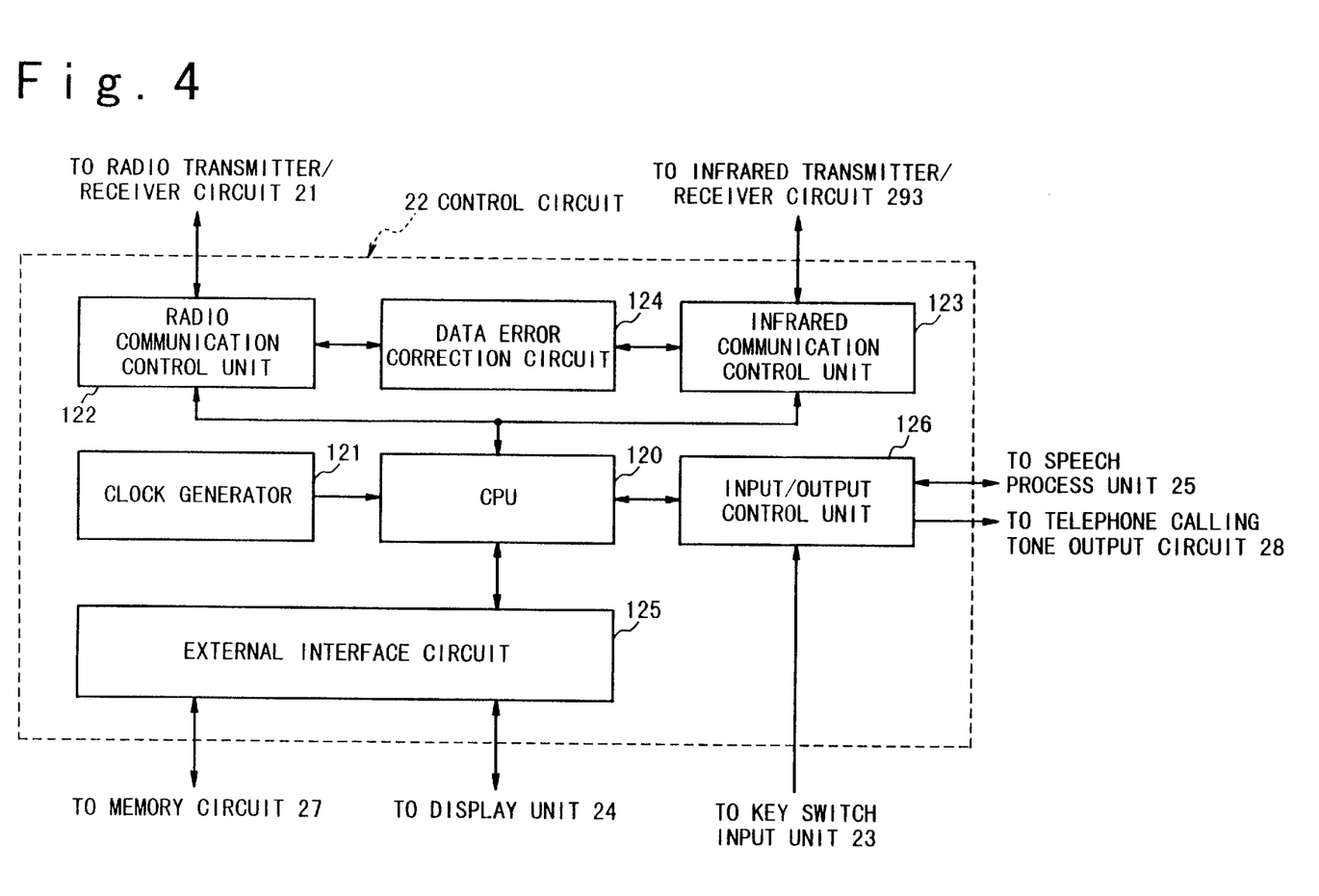
FIG. 4 is a schematic block diagram for indicating a circuit arrangement of a control circuit employed in the portable telephone shown in FIG. 2B.

Referring now to FIG. 4, the operations and arrangement of the control circuit 22 will be described in detail. An internal arrangement of this control circuit 22 is the substantially same as that of the above-explained control circuit 12 of the option apparatus 1 for the portable telephone. Accordingly, the same reference numerals shown in the control circuit 12 will be employed as those for denoting the same, or similar circuit elements, and only different arrangements will be explained.

The radio transmitter/receiver circuit 21 is connected to the radio communication control unit 122, and the infrared transmitter/receiver circuit 293 is connected to the infrared communication control unit 123, whose operations have been described above. Both the display unit 24 and the memory circuit 27 are connected to the external interface circuit 125. This external interface circuit 125 controls signal transmission/reception executed between these circuits and the CPU 120. The key switch input unit 23, the speech process unit 25 and the telephone calling tone output circuit 28 are connected to the input/output control unit 126. This input/output control unit 126 controls signal transmission/reception executed between these elements and the CPU 120.

Figure 5A:
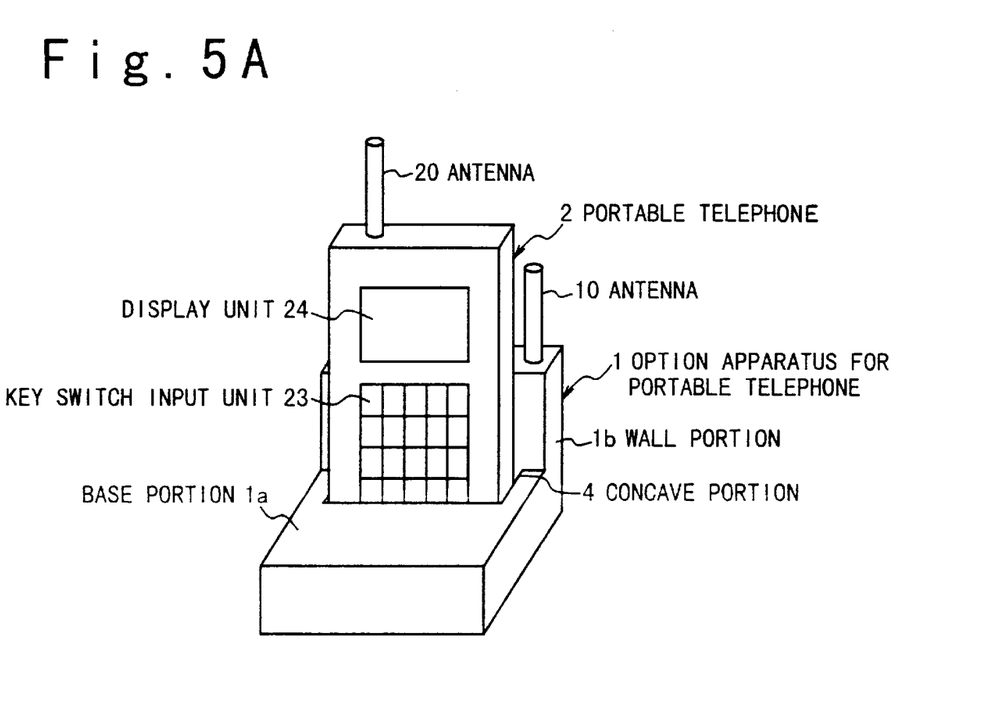
FIG. 5A is a perspective view for representing structural arrangements and connecting conditions of the portable telephone and the option apparatus for the portable telephone, according to an embodiment of the present invention.
Figure 5B:
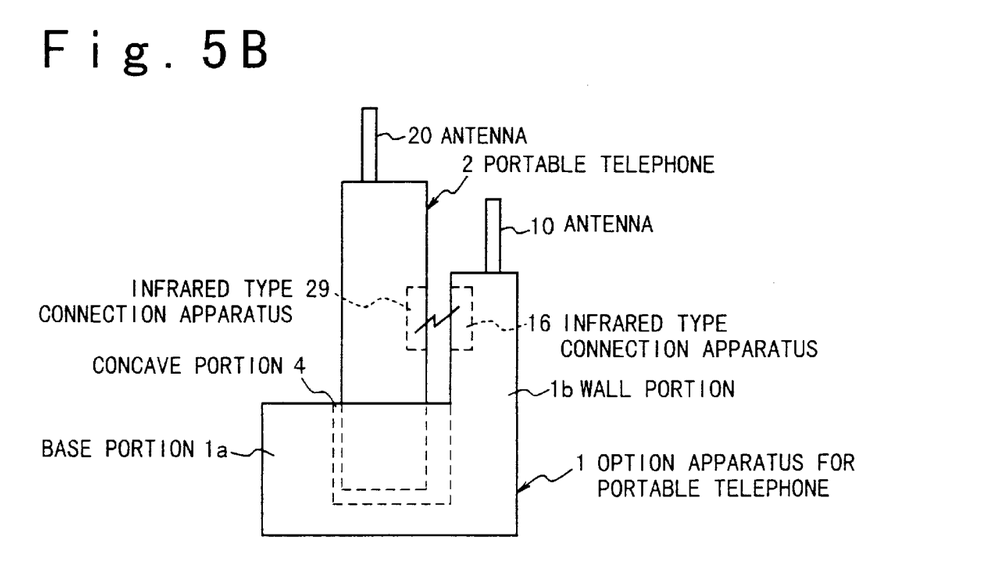
FIG. 5B is a side view for representing structural arrangements and connecting conditions of the portable telephone and the option apparatus for the portable telephone, according to an embodiment of the present invention.

Next, structural arrangements of the hands-free adapter functioning as the potion apparatus 1 for the portable telephone, and of the portable telephone 2 constructed in the above-described manner will now be explained with reference to FIG. 5A and FIG. 5B. It should be understood that in FIG. 5A and FIG. 5B, the connectors 46a, 46b, 60a, 60b, and the cable 61 are omitted.

The infrared type connection apparatus 29 is provided at a predetermined position of a rear surface of the portable telephone 2. Also, the option apparatus 1 for the portable telephone owns an L-shaped housing, and a concave portion 4 used to semi-fixedly insert the portable telephone 2 is formed in a base portion 1a thereof. The infrared type connection apparatus 16 is provided on a wall portion 1b of the housing at such a position. That is, this position is located opposite to the infrared type connection apparatus 29 of the portable telephone 2 when this portable telephone 2 is inserted into the concave portion 4. As a result, when the portable telephone 2 is inserted into this concave portion 4, the electrical connection between the option apparatus 1 for the portable telephone and the portable telephone 2 become best condition.

It should also be understood at even when since the size of the portable telephone 2 is larger, or smaller than the size of this concave portion 4, the portable telephone 2 cannot be semi-fixedly stored by this concave portion 4, if the distance between the option apparatus 1 for the portable telephone and the portable telephone 2 is limited within an infrared communication available range, then these appliances 2 and 1 can be connected to each other via the infrared radiation.

A description will now be made of operation of the portable terminal system arranged by the portable telephone 2 and the hands-free adapter functioning as the option apparatus 1 for the portable telephone, which have been constituted, as explained above. It should also be noted that when the option apparatus 1 for the portable telephone is the hands-free adapter, both the antenna 10 and the radio transmitter/receiver circuit 11 are brought into non-active states under control of the control circuit 12.

Figure 6:
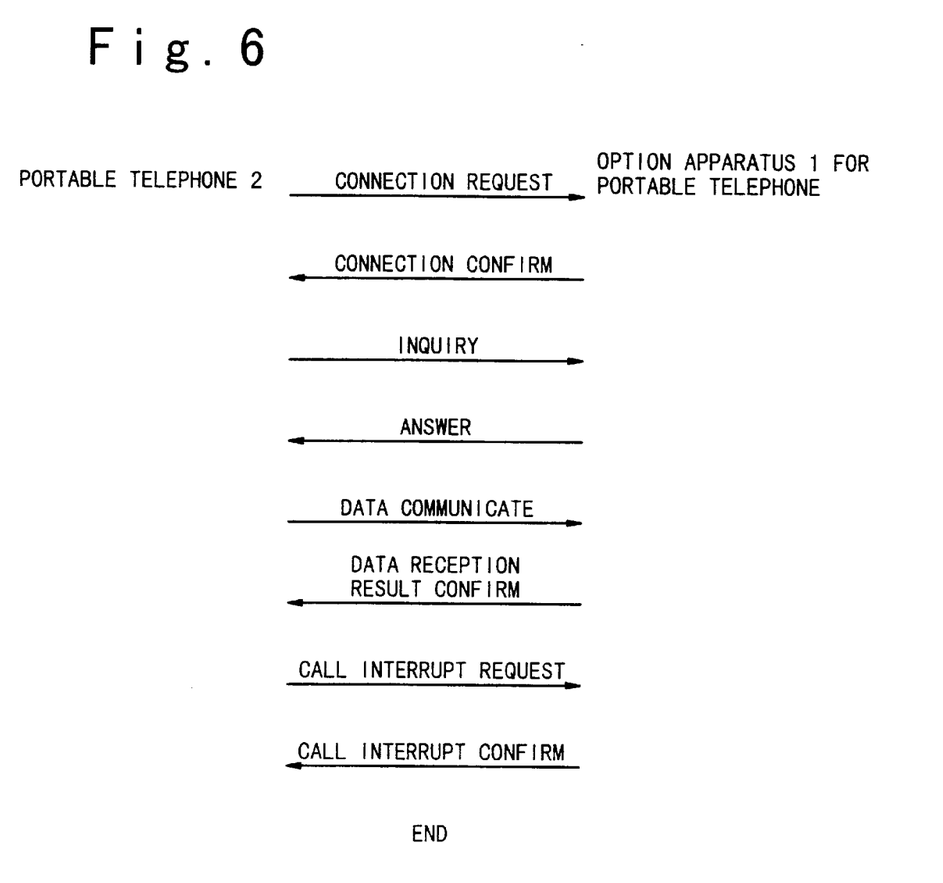
FIG. 6 is an explanatory diagram for explaining an communication sequence executed between the portable telephone and the option apparatus for the portable telephone, according to he embodiment of the present invention.

Referring now to an explanatory diagram of FIG. 6, a communication sequential operation executed between the option apparatus 1 for the portable telephone and the portable telephone 2 by using the infrared radiation will be first explained. First, when a telephone call is made, the portable telephone 2 transmits a message of "connection request" to the option apparatus 1 for the portable telephone. Upon receipt of this connection request message, the option apparatus 1 for the portable telephone will return a message of "connection confirm" to the portable telephone 2 if the communication connection is available.

Next, the portable telephone 2 transmits a message of "inquiry" for confirming as to whether or not the communication can be established to the option apparatus 1 for the portable telephone. Upon receipt of this inquiry message, the option apparatus 1 for the portable telephone checks as to whether or not the communication is available, and then returns a message of "answer" to the portable telephone 2.

If the above answer message indicates that the communication is available, then the portable telephone 2 transmits data to the option apparatus 1 for the portable telephone. Upon receipt of this data, the option apparatus 1 for the portable telephone checks as to whether or not the data can be correctly received, and then returns a message of "data reception result confirm" to the portable telephone 2.

If the message of "data reception result confirm" indicates that the data can be correctly received, then the portable telephone 2 sends a message of "call interrupt request" to the option apparatus 1 for the portable telephone. Upon receipt of this message of "call interrupt request", the optional apparatus 1 for the portable telephone returns a message of "call interrupt confirm" to the portable telephone 2. With execution of the above-described sequential operation, the communication established between the portable telephone 2 and the option apparatus 1 for the portable telephone is accomplished.

Next, operations of both the portable telephone 2 and the option apparatus 1 for the portable telephone in order to execute the above-described communication sequence will now be described with reference to flow charts.

Figure 7:
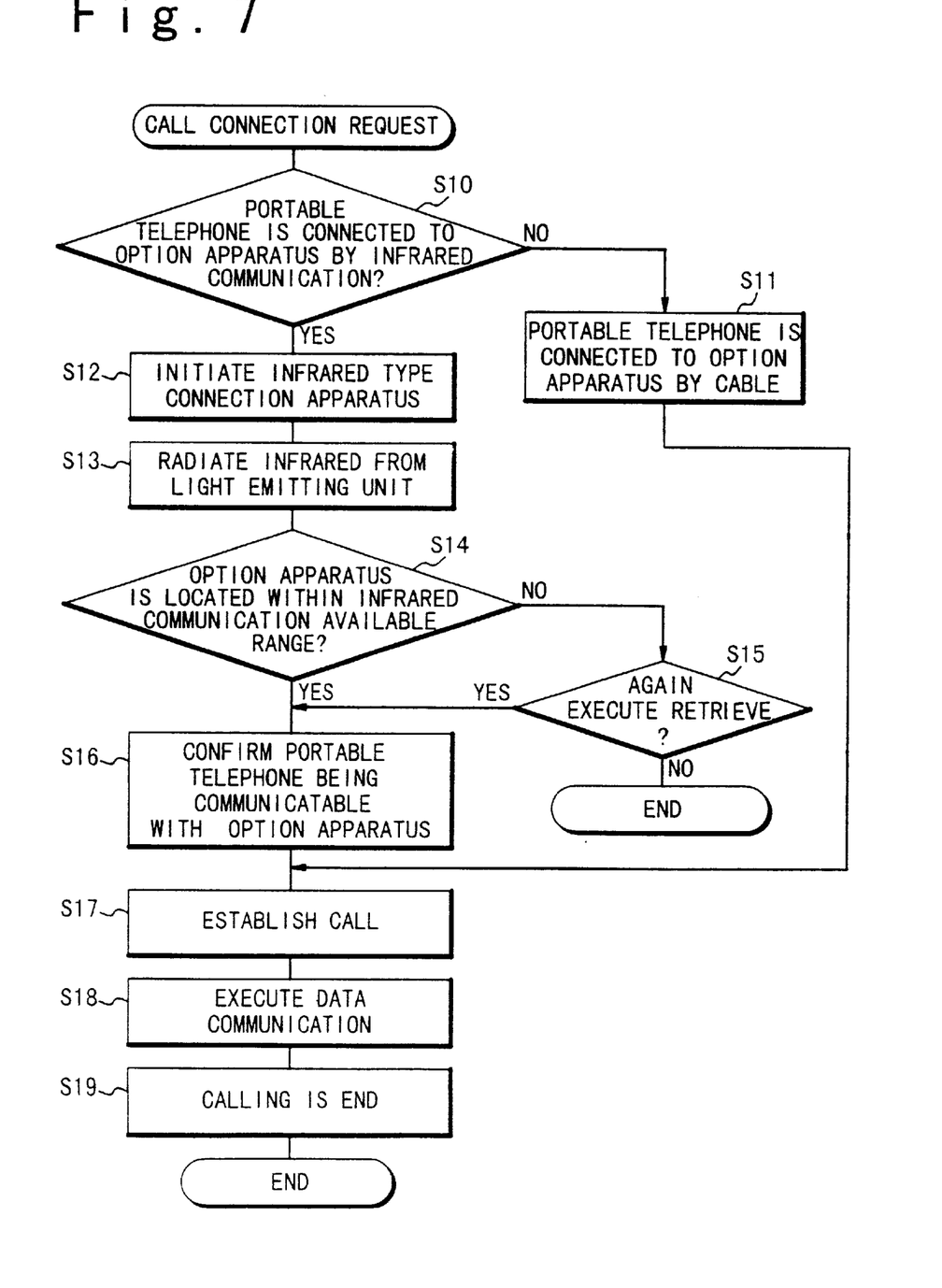
FIG. 7 is a flow chart for explaining operations of the option apparatus for the portable telephone according to the embodiment of the present invention.

First, operations of the portable telephone 2 will now be explained with reference to a flow chart shown in FIG. 7. In this flow chart, when a telephone call is made, the portable telephone 2 confirms that a call connection request is issued, and first checks as to whether or not the communication mode is set to such a mode that this portable telephone 2 is connected to the option apparatus 1 for the portable telephone by way of the infrared communication (step S10). In this step S10, when it is so judged that the communication mode is not set to such a mode that the portable telephone 2 is connected to the option apparatus 1 for the portable telephone by the infrared communication manner, the control circuit 22 switches a switch (not shown in detail) provided inside the control circuit 22 in order to connect this portable telephone 2 to the option apparatus 1 for the portable telephone by way of the cable 61. Thereafter, this sequential operation is branched to a step S17.

On the other hand, when it is so judged that the communication mode is set to such a mode that the portable telephone 2 is connected to the option apparatus 1 for the portable telephone by way of the infrared communication, the control circuit 22 switches the above switch provided inside the control circuit 22 in order to connect the portable telephone 2 to the option apparatus 1 for the portable telephone by employing the infrared type connection apparatus 29, and initiates this infrared type connection apparatus (step S12). Under normal condition, the supply of the power to the infrared type connection apparatus 29 is stopped so as to suppress the power consumption. To the contrary, since the process operation defined at the step S12 is carried out, the supply of the power to the infrared type connection apparatus 29 is commenced.

Next, the control circuit 22 supplies a predetermined signal to the light emitting unit 292 so as to emit the infrared radiation, so that the message of "connection request" is sent to the option apparatus 1 for the portable telephone (step S13). Subsequently, the control circuit 22 checks as to whether or not the option apparatus 1 for the portable telephone is located within the infrared communication available range (step S14). This is performed by checking as to whether or not the message of "connection confirm" is received from the option apparatus 1 for the portable telephone. In this case, when it is so judged that the option apparatus 1 for the portable telephone is not located within the infrared communication available range, a similar process operation is again carried out (step S15). As a result, when it is so judged that the option apparatus 1 for the portable telephone is not again located in the infrared communication available range, the connection sequence between the portable telephone 2 and the option apparatus 1 for the portable telephone is interrupted.

On the other hand, when it is so judged at the step S14, or the step S15 that the option apparatus 1 for the portable telephone is located within the infrared communication available range, another check is made as to whether or not the portable telephone 2 can be communicated with the option apparatus 1 for the portable telephone (step S16). This check is performed by sending the message of "inquiry" to the option apparatus 1 for the portable telephone and by checking as to whether or not the answer indicates "communication available". If it is so judged at this step S16 that the communication is not available, then the communication sequential operation is stopped, although not shown in the drawing. Conversely, when it is so judged that the communication is available, a call probability process operation is carried out (step S17). As a consequence, the communication between the portable telephone 2 and the option apparatus 1 for the portable telephone can be established.

Next, a data communication is commenced (step S18). In other words, the data is transmitted from the portable telephone 2 to the option apparatus 1 for the portable telephone, and then a message of "data reception result confirm" is returned from the option apparatus 1 for the portable telephone to the portable telephone 2. Then, when this data communication is completed, a call end process operation is carried out (step S19). That is to say, the portable telephone 2 transmits a message of "call interrupt request" to the option apparatus 1 for the portable telephone. Upon receipt of this message, the option apparatus 1 for the portable telephone returns a message of "call interrupt confirm" to the portable telephone 2, so that the communication established between the portable telephone 2 and the option apparatus 1 for the portable telephone is accomplished.

Figure 8:
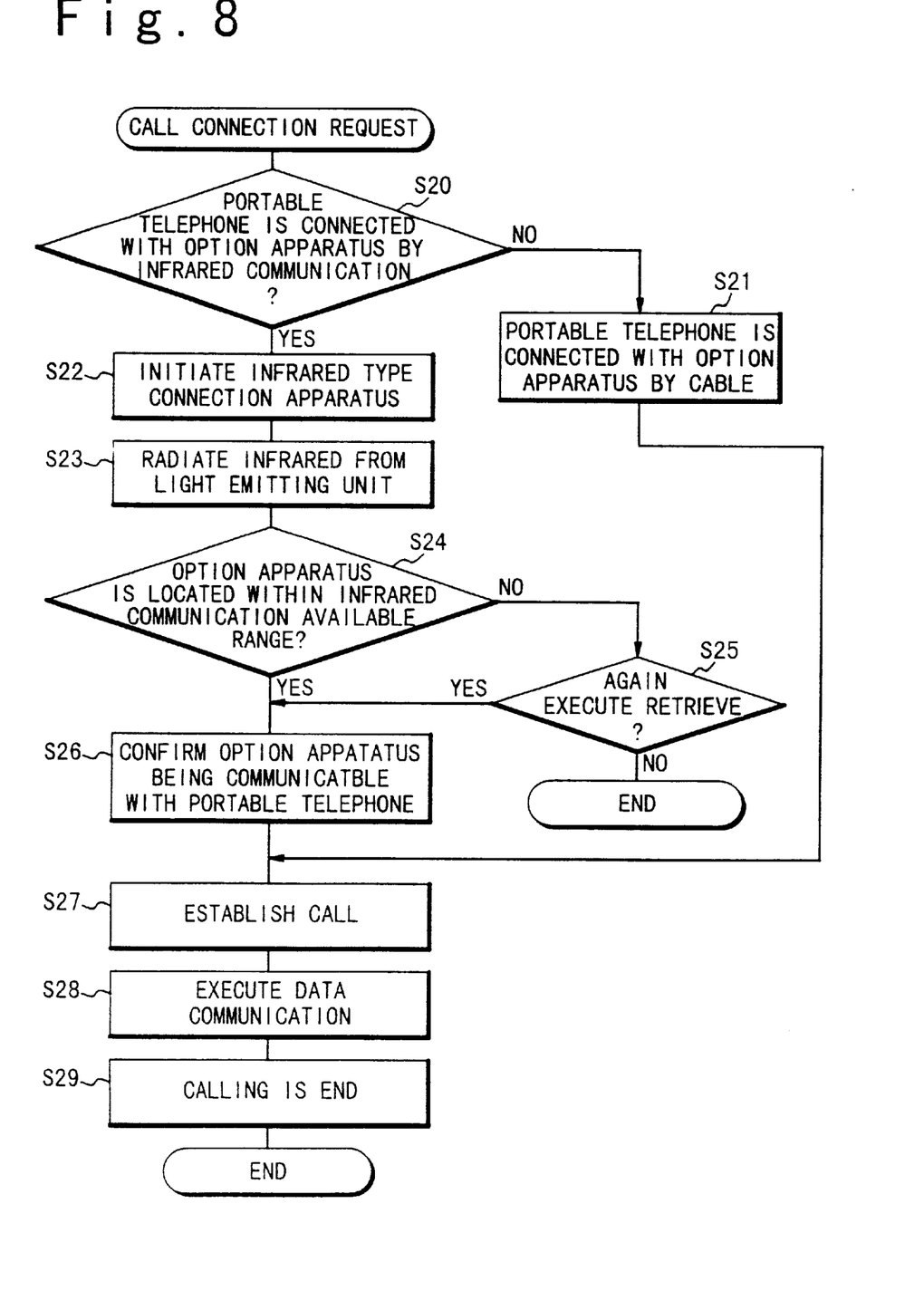
FIG. 8 is a flow chart for explaining operations of the portable telephone according to the embodiment of the present invention.

Referring now to a flow chart shown in FIG. 8, operations of the option apparatus 1 for the portable telephone will be explained. Upon receipt of the "connection request" message from the portable telephone 2, the option apparatus 1 for the portable telephone first checks as to whether or not the communication mode is set to such a mode that this option apparatus 1 for the portable telephone is connected to the portable telephone 2 by way of the infrared communication (step S20). In this step S20, when it is so judged that the communication mode is not set to such a mode that the option apparatus 1 for the portable telephone is connected to the portable telephone 2 by the infrared communication manner, the control circuit 12 switches a switch (not shown in detail) provided inside the control circuit 12 in order to connect this option apparatus 1 for the portable telephone to the portable telephone 2 by way of the cable 61. Thereafter, this sequential operation is branched to a step S27.

On the other hand, when it is so judged that the communication mode is set to such a mode that this option apparatus 1 for the portable telephone is connected to the portable telephone 2 by way of the infrared communication, the control circuit 12 switches the above switch provided inside the control circuit 12 in order to connect the option apparatus 1 for the portable telephone to the portable telephone 2 by employing the infrared type connection apparatus 16, and initiates this infrared type connection apparatus 16 (step S22). Under normal condition, the supply of the power to the infrared type connection apparatus 16 is stopped so as to suppress the power consumption. To the contrary, since the process operation defined at the step S22 is carried out, the supply of the power to the infrared type connection apparatus 16 is commenced.

Next, the light receiving unit 162 detects the infrared radiation (step S23). Subsequently, the control circuit 12 checks as to whether or not the option apparatus 1 for the portable telephone is located within the infrared communication available range (step S24). This is performed by checking as to whether or not the message of "connection request" is correctly received from the portable telephone 2. In this case, when it is so judged that the option apparatus 1 for the portable telephone is not located within the infrared communication available range, a similar process operation is again carried out (step S25). As a result, when it is so judged that the option apparatus 1 for the portable telephone is not again located in the infrared communication available range, the connection sequence between the portable telephone 2 and the option apparatus 1 for the portable telephone is interrupted.

On the other hand, when it is so judged at the step S24, or the step S25 that the option apparatus 1 for the portable telephone is located within the infrared communication available range, another check is made as to whether or not this option apparatus 1 for the portable telephone can be communicated with the portable telephone 2 (step S26), when the message of "inquiry" is sent from the portable telephone 2. Then, when it is so judged that the option apparatus 1 for the portable telephone is under communication non-available state, the communication sequential operation is stopped, although not shown in the drawing. On the other hand, when it is so judged that the option apparatus 1 for the portable telephone is under communication available condition, a message of "answer" is returned to the portable telephone 2, and thereafter a call probability process operation is carried out (step S27). As a consequence, the communication between the portable telephone 2 and the option apparatus 1 for the portable telephone can be established.

Next, a data communication is commenced (step S28). In other words, the option apparatus 1 for the portable telephone receivers data transmitted from the portable telephone 2 to check as to whether or not the data can be received under normal condition. Then, when it is so judged that the data can be received under normal condition, such a message of "data reception result confirm" indicative of this normal data reception is returned to the portable telephone 2. Then, when this data communication is completed, a call end process operation is carried out (step S29). That is to say, the portable telephone 2 transmits a message of "call interrupt request" to the option apparatus 1 for the portable telephone. Upon receipt of this message, the option apparatus 1 for the portable telephone returns a message of "call interrupt confirm" to the portable telephone 2, so that the communication established between the portable telephone 2 and the option apparatus 1 for the portable telephone is accomplished.

In accordance with the portable terminal system according to this embodiment of the present invention, normally, the portable telephone is connected to the option apparatus for the portable telephone via the infrared transfer path, but is not physically fitted to this option apparatus by employing the connector. Therefore, this connection can be readily and firmly established between them. In the case that the infrared transfer path cannot be used due to a certain reason, the portable telephone may be connected to the option apparatus for the portable telephone by using the cable 61, so that reliability of this portable terminal system can be increased. Also, since the portable telephone can be inserted into the optimal apparatus for the portable telephone under semi-fixed state, the better connection condition can be obtained. Furthermore, when the use specifications of the infrared communications established between the portable telephones and the option apparatuses for these portable telephones are united, the various portable telephones can be mutually connected to the various option apparatuses for the portable telephones, which are manufactured from different manufacturers and also own various shapes. Moreover, various sorts of portable telephones may be connected with a single option apparatus for portable telephones.

Figure 9:
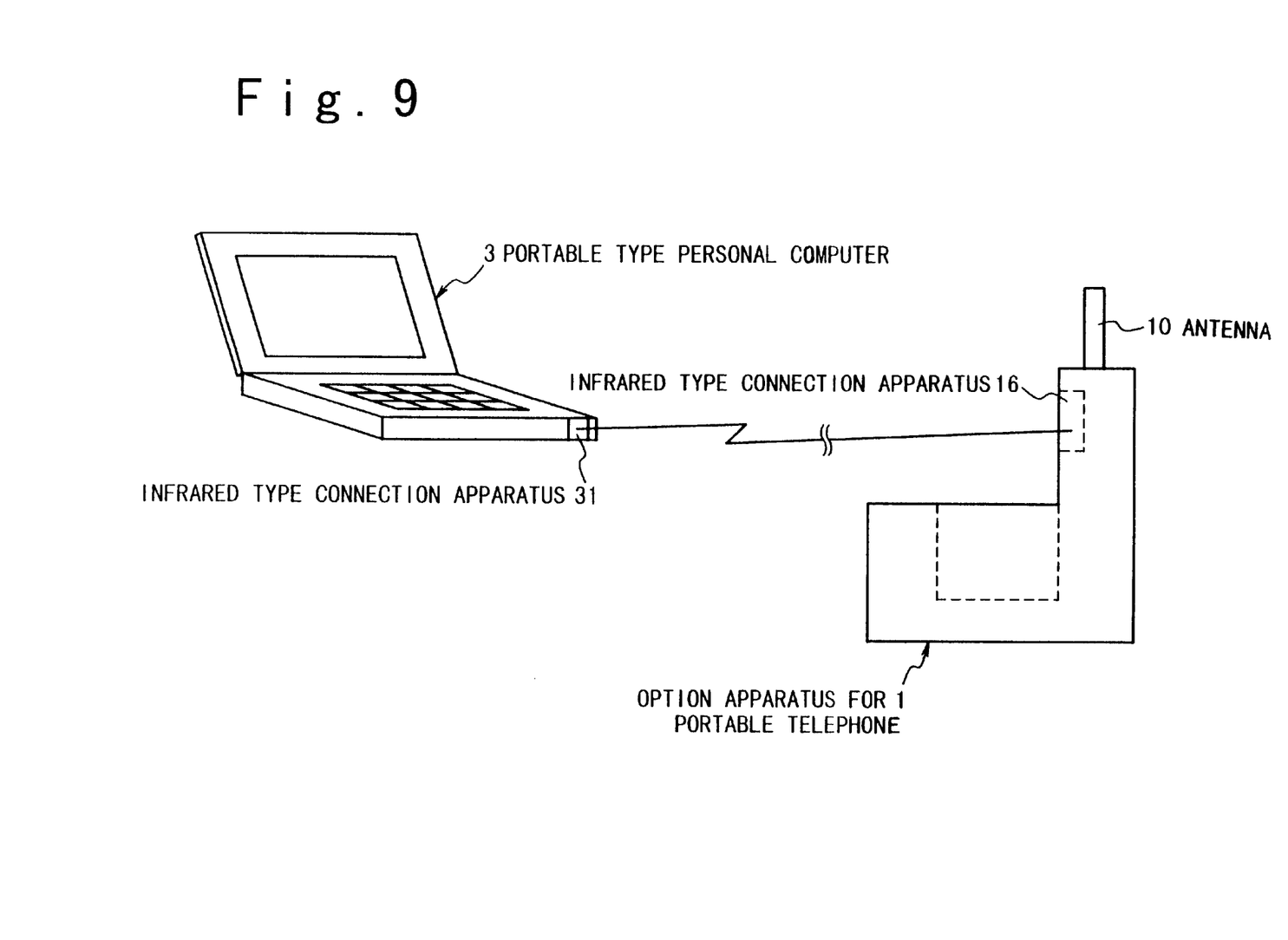
FIG. 9 schematically illustrates structural arrangements and a connecting condition between a portable personal computer and an option apparatus for a portable telephone, according to another embodiment of the present invention.

Next, another preferred embodiment of the present invention will now be described. FIG. 9 is a schematic block diagram for representing an arrangement of a portable terminal system in such a case that a portable type personal computer is used as a portable terminal unit.

In this portable terminal system, the option apparatus 1 for the portable telephone is used as a data adapter. The function of this data adapter may be realized by the option circuit 14 connected to the control circuit 12 shown in FIG. 2A. Then, both the antenna 10 and the radio transmitter/receiver circuit 11 indicated in FIG. 2A are brought into active states by the control circuit 12.

The portable type personal computer 3 is equipped with an infrared type connection apparatus 31. This infrared type connection apparatus 31 is used so as to establish an infrared communication between this portable type personal computer 3 and the option apparatus 1 for the portable telephone. An arrangement and operation of this infrared type connection apparatus 31 are identical to those of the above-described infrared type connection apparatus 29 of the portable telephone 2.

The option apparatus 1 for the portable telephone receives a radio signal transmitted from a base station (not shown) by the antenna 10, converts this received radio signal into an electric signal by the radio transmitter/receiver circuit 11, and then supplies this electric signal as reception data to the control circuit 12. The control circuit 12 converts this reception data into infrared radiation by the infrared type connecting apparatus 16, and supplies the infrared radiation to the infrared type connection apparatus 31 of the portable type computer 3. This portable type personal computer 3 acquires the above-described reception data from the infrared radiation received by the infrared type connection apparatus 31. As a consequence, the portable type personal computer 3 can acquire the data derived from the general-purpose radio line.

Also, the portable type personal computer 3 converts transmission data by the infrared type connection apparatus 16, and then supplies this infrared radiation to the infrared type connection apparatus 16 of the option apparatus 1 for the portable telephone. The control circuit 12 of the option apparatus 1 for the portable telephone supplies the transmission data extracted from the infrared radiation received by the infrared type connection apparatus 16 to the radio transmitter/receiver circuit 11. This radio transmitter/receiver circuit 11 converts the transmission data into a radio signal (electromagnetic wave) by the antenna 10 and then transmits this radio signal to the base station. As a consequence, the data derived from the portable type personal computer 3 can be transmitted via the general-purpose radio line to a desirable apparatus.

As previously described, when both the option apparatus 1 for the portable telephone and the portable type personal computer 3 are installed within the infrared radiation available range, since the radio transmitter/receiver circuit 11 employed in the option apparatus 1 for the portable telephone is activated, the portable type personal computer 3 can be connected to the general-purpose radio line so as to establish the data communication.

Similar to the above described embodiment, in accordance with the portable terminal system according to this embodiment, the portable type personal computer can be readily and firmly connected to the option apparatus for the portable terminal unit via the infrared transfer path.

As previously described in detail, in the portable terminal system of the present invention, the portable terminal unit can be connected to the option apparatus via the infrared transfer path without employing the physical connection by the connector under normal condition. As a consequence, the portable terminal unit can be simply and firmly connected with the option apparatus. Moreover, even when the physical interfaces of these units are different from each other, these units can be mutually connected. Also, the portable terminal unit can be moved while maintaining the infrared communication connections within such a range that the infrared radiation emitted from the option apparatus for the portable terminal unit can reach. Moreover, when such infrared type connection apparatuses having the united technical specification are provided with the respective terminal apparatuses, the various sorts of portable terminal units may be connected to the various sorts of option apparatuses for these portable terminal units, which are manufactured by different manufacturing firms.

What is claimed is:
1. A portable terminal system comprising:
    a portable terminal unit; and
    an option apparatus used with said portable terminal unit, wherein said option apparatus is comprised of:
        a first infrared receiving unit that receives infrared radiation sent from said portable terminal unit and converts said received infrared radiation into a first electric signal;
        a first infrared emitting unit that converts a second electric signal into infrared radiation and transmits said converted infrared radiation to said portable terminal unit;

a first radio transmitter/receiver unit that receives electromagnetic waves transmitted from a base station, derives a second information signal from said received electromagnetic waves and converts a first information signal supplied from a first control unit into electromagnetic waves and transmits said converted electromagnetic waves to the base station; and said first control unit being operative to produce said second electric signal based on said second information signal and to supply said produced second electric signal to said first infrared emitting unit, and further operative to produce said first information signal based on said first electric signal acquired from said first infrared receiving unit and to supply said produced first information signal to said first radio transmitter/receiver unit; and wherein said portable terminal unit is comprised of:

a second infrared receiving unit that receives infrared radiation sent from said option apparatus used with the portable terminal unit and converts said received infrared radiation into a third electric signal;

a second infrared emitting unit that converts a fourth electric signal into infrared radiation and transmits said converted infrared radiation to said option apparatus;

a second control unit that produces a third information signal based on said third electric signal derived from said second infrared receiving unit, produces said fourth electric signal based on said fourth information signal and transmits said produced fourth electric signal to said second infrared emitting unit;

a second radio transmitter/receiver unit that receives electromagnetic waves transmitted from the base station and derives a fourth information signal from said received electromagnetic waves;

said radio transmitter/receiver further being operative to convert said third information signal into electromagnetic waves and to transmit said converted electromagnetic waves to said base station; and said second control unit being operative to produce said fourth electric signal based on said fourth information signal and to supply said produced fourth electric signal to said second infrared emitting unit, and further operative to produce said third information signal based on said third electric signal and to supply said third information signal to said second radio transmitter/receiver unit.

2. A portable terminal system according to claim 1, wherein said portable terminal unit is a portable telephone.

3. A portable terminal system according to claim 2, wherein said option apparatus used with the portable terminal unit is arranged by a hands-free adapter.

4. A portable terminal system according to claim 3, wherein said option apparatus used with the portable terminal unit includes:

a housing for said first infrared receiving unit, said first infrared emitting unit, said first radio transmitter/receiver unit, and said first control unit, and wherein:

said housing includes a concave portion for storing said portable terminal unit.

5. A portable terminal system according to claim 4, wherein said first infrared receiving unit of said option apparatus used with the portable terminal unit is positioned opposite to said second infrared emitting unit of said portable terminal unit, and said first infrared emitting unit of said option apparatus used with the portable terminal unit is positioned opposite to said second infrared receiving unit of said portable terminal unit when said portable terminal unit is stored in said concave portion of said option apparatus housing.

6. A portable terminal system comprising:

a portable terminal unit;

an option apparatus used with said portable terminal unit; and a cable connecting said portable terminal unit to said option apparatus, said option apparatus being comprised of:

a first connection circuit coupled to said cable;

a first key switch input unit;

a first infrared receiving unit that receives a first infrared signal from said portable terminal unit and converts said first infrared signal into a first electric signal;

a first infrared emitting unit that converts a second electric signal into a second infrared signal and transmits said second infrared signal to said portable terminal unit;

a first control unit;

a first radio transmitter/receiver unit that receives electromagnetic waves transmitted from a base station, derives a second information signal from said received electromagnetic waves, converts a first information signal supplied by said first control unit into electromagnetic waves and transmits said electromagnetic waves to the base station;

said first control unit being operative to produce said second electric signal based on said second information signal, to supply said second electric signal to said first infrared emitting unit, to produce said first information signal based on said first electric signal, to supply said first information signal to said first radio transmitter/receiver unit and to selectively activate said first connection circuit or said first infrared receiving unit and said first infrared emitting unit in response to an instruction issued from said first key switch input unit;

said portable terminal unit being comprised of:

a second infrared receiving unit that receives said second infrared signal and converts said second infrared signal into a third electric signal;

a second infrared emitting unit that converts a fourth electric signal into said first infrared signal and transmits said first infrared signal to said option apparatus;

a second control unit that produces a third information signal based on said third electric signal, supplies said third information signal to said second radio transmitter/receiver unit, produces said fourth electric signal based on a fourth information signal, and provides said fourth electric signal to said second infrared emitting unit;

a second radio transmitter/receiver unit that receives electromagnetic waves transmitted from the base station, derives said fourth information signal from said received electromagnetic waves, converts said third information signal into electromagnetic waves and transmits said converted electromagnetic waves to the base station;

a second connection circuit coupled to said cable; and a second key switch input unit;

said second control unit being further operative to selectively activate said second connection circuit or said second infrared receiving unit and said second infrared emitting unit in response to an instruction issued from said second key switch input unit.

7. A portable terminal system according to claim 6, wherein said portable terminal unit is a portable telephone.

8. A method for connecting a portable terminal unit to an option apparatus used with the portable terminal unit, comprising:

as a first step, transmitting information from said option apparatus to said portable terminal unit; and as a second step, transmitting information from said portable terminal unit to said option apparatus, said first step comprising, in said option apparatus:
  receiving electromagnetic waves transmitted from a base station;
  deriving a first information signal from the received electromagnetic waves;
  converting the derived first information signal into a first infrared signal, and
  transmitting said first infrared signal to said portable terminal unit; and, in said portable terminal unit:
  receiving said first infrared signal; and
  deriving a second information signal from said first infrared signal;

said second step comprising,
in said portable terminal unit:
  converting a third information signal into a second infrared signal; and transmitting the second infrared signal to said option apparatus; and, in said option apparatus:
  receiving said second infrared signal;
  deriving a fourth information signal from the received infrared radiation;
  converting the fourth information signal into electromagnetic waves; and
  transmitting the converted electromagnetic waves to the base station;

said first step further comprising, in said option apparatus:
  converting a fifth information signal into a third infrared signal; and
  transmitting the fifth infrared signal to said portable terminal unit; and in said portable terminal unit:
  receiving said third infrared signal;
  deriving a sixth information signal from said third infrared signal;
  converting the sixth information signal into electromagnetic waves, and transmitting said converted electromagnetic waves to the base station;

said second step further comprising, in said portable terminal unit:
  receiving electromagnetic waves transmitted from the base station;
  deriving a seventh information signal from said received electromagnetic waves;
  converting said seventh information signal into a fourth infrared signal; and
  transmitting said fourth infrared signal to said option apparatus; and in said option apparatus:
  receiving said fourth infrared signal.

* * * * *